US008184597B2

(12) United States Patent
Englund et al.

(10) Patent No.: US 8,184,597 B2
(45) Date of Patent: May 22, 2012

(54) TECHNIQUE FOR RADIO RESOURCE MANAGEMENT

(75) Inventors: Eva Englund, Linköping (SE); Gunnar Bark, Linköping (SE); Tjeerd De Boer, Märsta (SE); Patrik Karlsson, Älta (SE); Dirk Gerstenberger, Kista (SE); Mats Sagfors, Kyrkslätt (FI); Fredrik Gunnarsson, Linköping (SE); Ke Wang Helmersson, Linköping (SE); Stefan Parkvall, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 894 days.

(21) Appl. No.: 11/795,821

(22) PCT Filed: Jan. 20, 2006

(86) PCT No.: PCT/EP2006/000511
§ 371 (c)(1),
(2), (4) Date: Feb. 14, 2008

(87) PCT Pub. No.: WO2006/077141
PCT Pub. Date: Jul. 27, 2006

(65) Prior Publication Data
US 2008/0214197 A1 Sep. 4, 2008

(30) Foreign Application Priority Data
Jan. 21, 2005 (SE) ........................ 0500198

(51) Int. Cl.
*H04B 7/216* (2006.01)
(52) U.S. Cl. ..... 370/335; 370/329; 455/450; 455/452.2; 455/561

(58) Field of Classification Search .................. None
See application file for complete search history.

(56) References Cited

U.S. PATENT DOCUMENTS

| | | | | |
|---|---|---|---|---|
| 5,471,670 A * | 11/1995 | Hess et al. | .................. | 455/437 |
| 6,668,175 B1 * | 12/2003 | Almgren et al. | .............. | 455/522 |
| 6,795,689 B1 * | 9/2004 | Ogren et al. | ............... | 455/67.13 |
| 7,133,673 B2 * | 11/2006 | Zeira et al. | .................... | 455/436 |
| 7,542,444 B2 * | 6/2009 | Kitazoe et al. | ................ | 370/328 |
| 7,616,601 B2 * | 11/2009 | Norrgard et al. | .............. | 370/329 |
| 7,684,408 B2 * | 3/2010 | Wakabayashi | ............. | 370/395.4 |
| 7,693,102 B2 * | 4/2010 | Hayashi | ........................ | 370/329 |
| 7,773,513 B2 * | 8/2010 | Beaujean et al. | ............. | 370/230 |
| 8,072,986 B2 * | 12/2011 | Wakabayashi | ............. | 370/395.4 |

(Continued)

OTHER PUBLICATIONS

3rd Generation Partnership Project; Technical Specification Group Radio Access Network; Medium Access Control (MAC) protocol specification (Release 6), 3GPP TS 25.321 v6.3.0, Dec. 2004, pp. 1-73.*

(Continued)

*Primary Examiner* — Donald Mills
(74) *Attorney, Agent, or Firm* — Nixon & Vanderhye, P.C.

(57) ABSTRACT

A radio resource management technique in a cellular telecommunication system is disclosed. The telecommunication system comprises at least one radio network controlling component and one or more base station components operable to implement an uplink scheduling scheme in relation to one or more user terminals. A method embodiment comprises the steps of receiving, by one of the base station components from the at least one radio network controlling component, at least one interference control parameter, of generating one or more scheduling grants taking into account the at least one interference control parameter, and of issuing the one or more scheduling grants to one or more user terminals.

20 Claims, 5 Drawing Sheets

U.S. PATENT DOCUMENTS

2001/0055971 A1    12/2001    Irwin et al.
2004/0106426 A1*    6/2004    Koo et al. ..................... 455/522
2006/0176811 A1*    8/2006    Yang et al. ..................... 370/229
2008/0214197 A1*    9/2008    Englund et al. ............... 455/450
2009/0274078 A1*   11/2009    Zhao et al. ..................... 370/293

OTHER PUBLICATIONS

"Universal Mobile Telecommunications Systems (UMTS); FDD enhanced uplink; Overall description; Stage 2 (3GPP TS 25.309 version 6.1.0 Release 6); ETSI TS 125 309," ETSI Standards, vol. 3-R2, No. V610, Dec. 2004, XP014027652.

Nokia: "E-TFC Limitation for UE," 3GPP TSG-RAN WG2 #45BIS, [Online], Jan. 14, 2005, XP002370694.

QUALCOMM: "Overload Indicator Command Triggering," 3GPP TSG-RAN WG2 #45BIS, [Online], Jan. 14, 2005, XP002370693.

NEC: "Radio resource management," 3GPP TSG-RAN WG2 #45BIS, [Online], Jan. 14, 2005, XP002370692.

3GPP TSG-RAN WG1 Meeting #38bis, Tdoc R1-041095, "Overall RoT Management" Seoul, Korea, Sep. 20-24, 2004.

International Search Report for PCT/EP2006/000511 mailed Mar. 21, 2006.

Written Opinion for PCT/EP2006/000511 mailed Mar. 21, 2006 (6 pages).

"Measurement Requirement for EDCH," 3GPP TSG-RAN WG3, Tdoc R3-041476, Nov. 15-19, 2004, 7 pages.

Chinese Office Action and English translation thereof mailed Jan. 26, 2011 in Chinese application 200680002905.6.

NEC: "Radio Resource Management", 3GPP TSG-RAN WG2 #45BIS, Resubmission of R2-042466, Sophia Antipolis, France, Jan. 10-14, 2005.

\* cited by examiner

TECHNIQUE FOR RADIO RESOURCE MANAGEMENT

This application is the US national phase of international application PCT/EP2006/000511 filed 20 Jan. 2006, which designated the U.S. and claims priority to SE 0500198-7 filed 21 Jan. 2005, the entire content of each of which is hereby incorporated by reference.

FIELD OF THE INVENTION

The present invention generally relates to radio resource management in a cellular telecommunication system. In particular, the invention relates to a radio resource management technique that can be used in combination with an uplink scheduling scheme.

BACKGROUND

Figure 1:
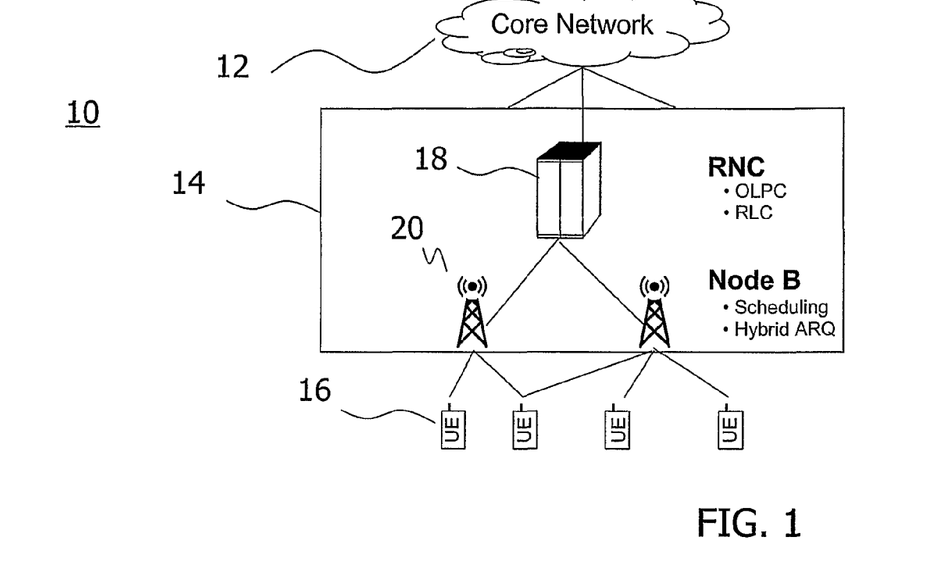
FIG. 1 is a schematic illustration of example WCDMA architecture in which the technology disclosed herein can be practised.

FIG. 1 shows an illustration of an exemplary wideband code division multiple access (WCDMA) architecture 10 including a core network 12, a radio access network (RAN) 14 and a plurality of user terminals 16, also referred to as user equipment (UE). The RAN includes one or more components 18 responsible for radio network control (RNC) and one or more base station components 20, also referred to as "Nodes B", that mainly perform air interface processing. Each base station component 20 serves one or more network cells. One RNC component 18 and one or more associated base station components 20 constitute a radio network subsystem (RNS). A RAN typically comprises a plurality of such RNSs.

Enhancements in the uplink direction of WCDMA are currently being standardised within the 3rd generation partnership project (3GGP). Among the various standardized features are fast scheduling and fast hybrid automatic repeat request (HARQ) as described in the technical specification TS 25.309 "FDD Enhanced Uplink".

Conventional radio resource management techniques include features such as admission and congestion control (ACC), radio link control (RLC), and outer loop power control (OLPC). As shown in FIG. 1, these features are conventionally located in the RNC component 18. On the other hand, the new features introduced for enhancing the uplink direction, such as fast scheduling and fast HARQ, are located in the base station components 20.

Figure 2:
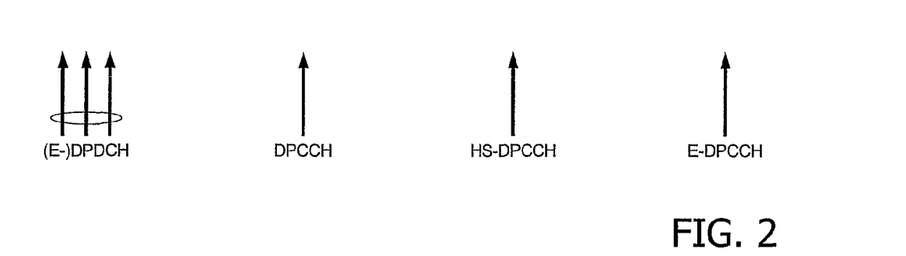
FIG. 2 is a schematic diagram illustrating various uplink channels.

The technical specification TS 25.309 not only introduces new control features but also new uplink channels. In addition to conventional uplink channels such as the dedicated physical data channel (DPDCH) and the (high speed) dedicated physical control channel ((HS-) DPCCH), an enhanced DPDCH (E-DPDCH) and an enhanced DPCCH (E-DPCCH) are introduced as shown in FIG. 2. The DPCCH carries pilot symbols and portions of the outband control signalling. Remaining outband control signalling for implementing the enhancements in the uplink direction is carried on the E-DPCCH, while the E-DPDCH carries the data transmitted using the enhanced uplink features. According to the technical specification TS 25.309, the term E-DCH generally denotes a new dedicated transport channel type or enhancements to an existing dedicated transport channel type. In this connection, an E-DCH active set, or simply active set, designates the set of cells which carry the E-DCH for one particular user terminal.

In the following, the feature of fast uplink scheduling will be discussed in more detail. Generally, fast scheduling as used in the uplink context here denotes the possibility for a base station component 20 to control when a user terminal 16 is transmitting and, in combination with adaptive modulation and coding (AMC), at which data rate.

Using the fast scheduling feature, the base station component 20 sends a resource indication ("scheduling grant") in the downlink to the user terminal 16. The scheduling grant indicates to the user terminal the maximum amount of uplink resources the user terminal is allowed to use. The scheduling grants are used in connection with the E-DCH transport format combination (TFC) selection and control the maximum allowed E-DPDCH/DPCCH power ratio. In general, the scheduling grants set an upper limit on the data rate a particular user terminal may use. However, the power situation in a particular user terminal, as well as activity on other, non-scheduled channels, may lead to the situation that the user terminal transmits with a lower data rate on the E-DCH than that indicated by means of the scheduling grants.

The scheduling grants can be divided into absolute grants on the one hand and into relative grants on the other. By using these two types of grants, the scheduling base station component can control the transmission behaviour of each individual user terminal.

Absolute grants are used to set an absolute limitation (in terms of power ratio relative DPCCH) for the maximum amount of uplink resources the E-DCH may use for data transmission. The maximum amount of uplink resources allowed for E-DCH data transmission determines the maximum data rate on E-DCH. Typically, absolute grants are used for significant but infrequent changes of the resource allocation for a particular user terminal (e.g. at times of bearer setup or when granting resources in response to a scheduling request received from a user terminal).

Generally, there is only a single E-AGCH for all user terminals that are served by a particular cell. Absolute grants are sent by the E-DCH cell serving a particular user terminal and transmitted on a control channel called E-AGCH (E-DCH absolute grant channel) that can be shared by multiple user terminals.

Figure 3:
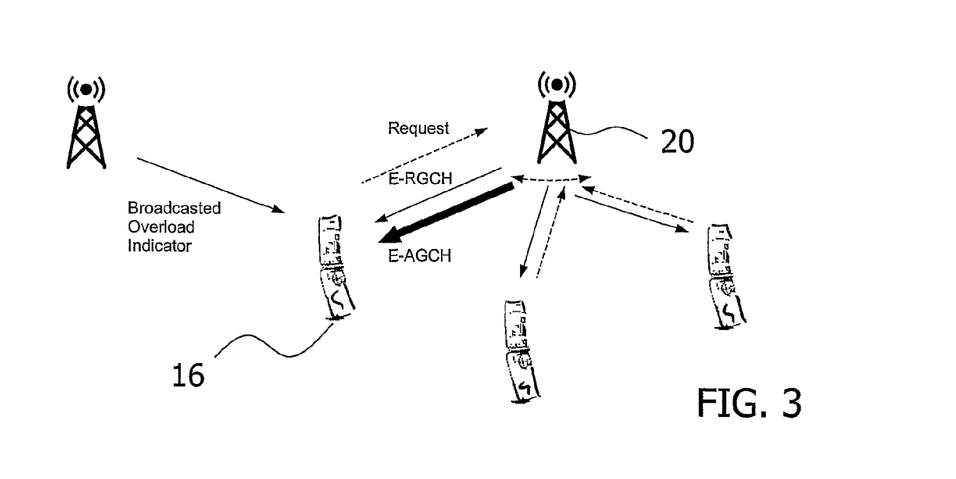
FIG. 3 is a schematic diagram illustrating radio resource management signaling.

Relative grants on the other hand are used to update the resource allocation for a particular terminal. Relative grants can be sent by serving as well as non-serving base station components and typically as a complement to absolute grants. A relative grant from a serving cell can take one of three different signaling contents, namely either "up", "down" or "hold". A relative grant from a non-serving cell can take one of two different values, "down" or "hold". These signaling contents refer to uplink resource limitations associated with a user terminal relative to the amount of resource the user terminal is currently using. Relative grants are transmitted on individual control channels, namely on E-DCH relative grant channels (E-RGCHs). FIG. 3 shows a schematic illustration of E-RGCH und E-AGCH signaling.

There is one E-RGCH per user terminal from the serving cell, and each user terminal may receive one relative grant per transmission time interval (TTI). Thus, the relative grants have some similarities with power control instructions.

In a soft handover scenario, in which a user terminal is communicating with a plurality of cells, the user terminal receives absolute grants only from a single one of these cells, namely from the serving E-DCH cell (or simply serving cell). The serving cell has therefore the main responsibility for the scheduling operation. However, also non-serving cells involved in a soft handover with a particular user terminal are able to influence the resource consumption of this user terminal in order to control the overall interference level within their own cell coverage. In this context, a particular user terminal may receive relative grants from both the serving cells and all non-serving cells involved in a soft handover with the particular user terminal.

A serving E-DCH radio link set (or simply serving RLS) denotes the set of cells which contains at least the serving cell and from which the user terminal can receive relative grants and absolute grants. Each user terminal has only one serving RLS. A non-serving E-DCH RLS (or simply non-serving RLS) denotes the set of cells which does not contain the serving cell and from which the user terminal can receive absolute grants. A user terminal may have zero, one or several non-serving RLSs.

Base station components of the non-serving RLS will only send relative grants to the user terminal. The relative grants from such base station components are restricted to the value "down" and "hold". In the absence of a "down" from any non-serving RLS, the user terminal simply follows the serving RLS's scheduling grants.

If a user terminal is receiving a "down" from any non-serving cell, this is an indication that the cell in question is overloaded and the user terminal shall therefore reduce its data rate compared to the data rate it is currently using (even if one or more grants from the serving cell suggest an increase). Thus, the relative grant from a non-serving cell serves as an overload indicator. The overload indicator is sent to all user terminals for which the overloaded cell is a non-serving cell as shown FIG. 3.

In addition to scheduling grants, the fast scheduling scheme further includes resource demands ("scheduling information") that can be issued by user terminals to request radio resources. By means of such scheduling information, a user terminal may indicate its current status (e.g. to provide an indication of its buffer status, traffic priority and power availability) as shown in FIG. 3. The scheduling information can be exploited by the scheduling base station component in its scheduling decision.

The scheduling information is sent in the same way as data transmissions (i.e. on the E-DCH) and thus benefit from the gains of HARQ with soft combining. Even if the user terminal has no scheduling grant and is therefore not allowed to transmit any user data on the E-DCH, the user terminal is still allowed to transmit scheduling information inband. In addition to the inband scheduling information, there is a single "happy" bit included in the uplink outband control signalling sent on the E-DPCCH. This happy bit is used to indicate that the terminal supports and would benefit from a higher data rate.

It has been found that in conventional cellular communication systems including uplink scheduling, the radio resource management could be improved due to an insufficient overall coordination of the radio resource management functions for the uplink direction. Accordingly, there is a need for an improved radio resource management technique.

SUMMARY

According to a first aspect, a method of radio resource management in a cellular telecommunication system comprising at least one radio network controlling component and one or more base station components is provided, wherein the one or more base station components are operable to implement an uplink scheduling scheme in relation to one or more user terminals. The method comprises receiving, by one of the base station components from the at least one radio network controlling component, at least one interference control parameter, generating one or more scheduling grants taking into account the at least one interference control parameter, and issuing the one or more scheduling grants to one or more user terminals.

The method may further comprise evaluating the at least one interference control parameter. If the at least one interference control parameter is associated with a particular cell, the present interference situation in this cell may be evaluated also. Based on the one or more evaluations, it may then be decided whether or not interference control actions are actually necessary. If so, the method may proceed with generating the one or more scheduling grants as set forth above.

The one or more generated scheduling grants can comprise at least one absolute grant, at least one relative grant or a combination of absolute and relative grants. The scheduling grants can be issued to at least one of a first set of user terminals served by the issuing base station component and a second set of user terminals not served by the issuing base station component.

According to one variation, the at least one interference control parameter comprises one or more interference limitation parameters specifying an interference limit. In this case a notification message may be sent to the radio network controlling component if the signalled interference limit is not or cannot be met. A notification message may bear various indications. The notification message indicates for example that a cell or cell portion associated with the issuing base station component has an interference (or load) exceeding a first limit although the interference resulting from at least one of a first set of user terminals served by the issuing based station component and a second set of user terminals not served by the issuing based station component has been decreased to a second limit.

Based on the received interference control parameter, the scheduling grants may be generated with various intentions. According to a first scenario, the generated scheduling grants aim at not exceeding the interference limit. According to a second scenario, that can be combined with a first scenario, the generated scheduling grants aim at balancing interference contributions from a first set of mobile terminals served by the issuing base station component and a second set of mobile terminals served by another base station component.

Depending on the particular circumstances, the interference limitation parameters can take various forms. The one or more interference limitation parameters may for example be selected from the group comprising a received total wideband power (RTWP) related parameter, a noise-rise related parameter, a throughput related parameter, a received signal power related parameter, and a parameter indicative of a received power relation between a first set of mobile terminals served by the issuing base station component and a second set of mobile terminals served by another base station component. In one scenario, the interference limitation parameter is therefore indicative of a maximum total RTWP value reflective of the total interference including contributions from all uplink traffic and external interferers. An additional or alternative interference limitation parameter that may be considered by the base station component during generation of the scheduling grants may be a target value of non-serving E-DCH to serving E-DCH power ratio per cell (e.g. the ratio of non-serving RLS E-DCH power and serving RLS E-DCH power received at the base station component).

The method may additionally comprise the steps of determining interference-related information, and reporting the interference-related information to the radio network controlling component. The interference-related information comprises for example at least one of RTWP information (such as a total RTWP value), hardware consumption information in relation to the reporting base station component, load information in relation to user terminals served by a particular base station component or served by base station components excluding the particular base station component, noise-rise information, overload information derived for example from scheduling statistics, and bit rate information (such as the provided bit rate per logical channel priority per cell).

In a further variation, the at least one interference control parameter comprises a cell group association parameter indicating in relation to a particular user terminal if it is to be controlled by relative scheduling grants from one or more particular base station components. According to a first option, the cell group association parameter is considered by the base station component when generating one or more scheduling grants in such a way that no relative scheduling grants are sent by the base station component to a particular user terminal indicated in the cell group association parameter. According to a second option, the cell group association parameter is forwarded transparently from the base station component to a particular user terminal and informs the particular user terminal of the one or more base station components it should not follow in relation to relative grants.

Preferably, each user terminal is associated with a controlling cell set indicative of base station components issuing relative scheduling grants that a particular user terminal must mandatarily obey. In this case, the cell group association parameter may indicate to a particular user terminal or base station component a modification of the controlling cell set. Such a modification may comprise an addition, removal and/or replacement of an individual cell in the controlling cell set.

According to a further aspect, a method of radio resource management in a cellular telecommunication system comprising at least one radio network controlling component and or more base station component is provided, wherein the one or more base station components are operable to implement an uplink scheduling scheme in relation to one or more user terminals, and wherein the method comprises generating, by at least one radio network controlling component, at least one interference control parameter, and sending the at least one interference control parameter to one or more base station components.

As outlined above, the at least one interference control parameter may comprise one or more interference limitation parameters specifying an interference limit that is to be met by way of uplink scheduling. Additionally, or in the alternative, the at least one interference control parameter may comprise one or more cell group association parameters indicating in relation to a particular user terminal if it is to be controlled by relative scheduling grants of one or more particular base station components. If the at least one interference control parameter comprises one or more cell group association parameters, an individual user terminal may be associated with a controlling cell set indicative of base station component issuing relative scheduling grants that have to be mandatorily implemented by the particular user terminal. The cell group association parameter may be indicative of a modification of the controlling cell set.

Additionally, the method may comprise the step of sending a message to one or more of the base station components requesting them to notify the radio network controlling component in the case a cell or cell portion associated with a particular base station component has an interference exceeding a first threshold (or limit) although the interference resulting from at least one of a first set of user terminals served by the particular base station component and a second set of user terminals not served by the particular base station component has been decreased to a second threshold (or limit).

The method may further comprise the steps of receiving interference related information from one or more base station components, and generating the at least one interference control parameter based on the received interference related information. The interference related information may comprise a measured or estimated total RTWP value and/or a value indicative of a provided bit rate.

According to a further aspect, a method of radio resource management in a cellular telecommunication system comprising at least one radio network controlling component and one or more base station components is provided, wherein the one or more base station components are operable to implement an uplink scheduling scheme in relation to one or more user terminals, and wherein the method comprises determining, by one or more of the base station components, interference related information, and reporting the interference related information to the at least radio network controlling component. The interference related information may for example be determined by measurements or by way of estimation. Various possibilities concerning the information that can be determined have already been indicated above.

According to a still further aspect, a method of radio resource management in a cellular telecommunication system comprising at least one radio network controlling component and one or more base station components is provided, the method comprising receiving, by the radio network controlling component, interference related information from at least one base station component, and evaluating the interference related information for at least one of interference, admission and congestion control purposes.

The technology disclosed herein can be practised in the form of one or more pieces of hardware, as a software solution, or as a combination thereof. As for a software solution, a computer program product comprising program code portions for performing the steps of one or more of the methods when the computer program product is run on or more computing devices is provided. The computer program product may be stored on a computer-readable recording medium.

As for a hardware aspect a base station component for a cellular telecommunication system including at least one radio network control component is provided, wherein the base station component is operable to implement an uplink scheduling scheme in relation to one or more user terminals and comprises a first interface for receiving, from the at least one radio network controlling component, at least one interference control parameter, a generator for generating one or more scheduling grants taking into account in the at least one interference control parameter, and a second interface for issuing the one or more scheduling grants to one or more user terminals.

According to a complementary hardware aspect, a radio network controlling component for a cellular telecommunication system including one or more base station components operable to implement an uplink scheduling scheme in relation to one or more user terminals is provided. The radio network controlling component comprises a generator for generating at least one interference control parameter, and an interface for sending the at least one interference control parameter to one or more base station components.

BRIEF DESCRIPTION OF THE DRAWINGS

In the following, the technology disclosed herein will be described with reference to exemplary embodiments illustrated in the drawings, wherein.

DETAILED DESCRIPTION

In the following description, for purposes of explanation and not limitation, specific details are set forth, such as particular sequences of steps, signaling sequences and device configurations in order to provide a thorough understanding of the technology disclosed herein. It will be apparent to one skilled in the art that the technology disclosed herein may be practised in other embodiments that depart from these specific details. In particular, while the embodiments will be described below in a WCDMA context, and with respect to a specific 3GGP scheduling scheme, it is to be understood that the technology disclosed herein can also be implemented in context with other telecommunication standards, such as CDMA2000, and other scheduling mechanisms.

Moreover, those skilled in the art will appreciate that the functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the technology disclosed herein may also be embodied in a computer program product as well as a system comprising a computer processor and a memory coupled to the processor, wherein the memory is encoded with one or more programs that may perform the functions disclosed herein.

Figure 4:
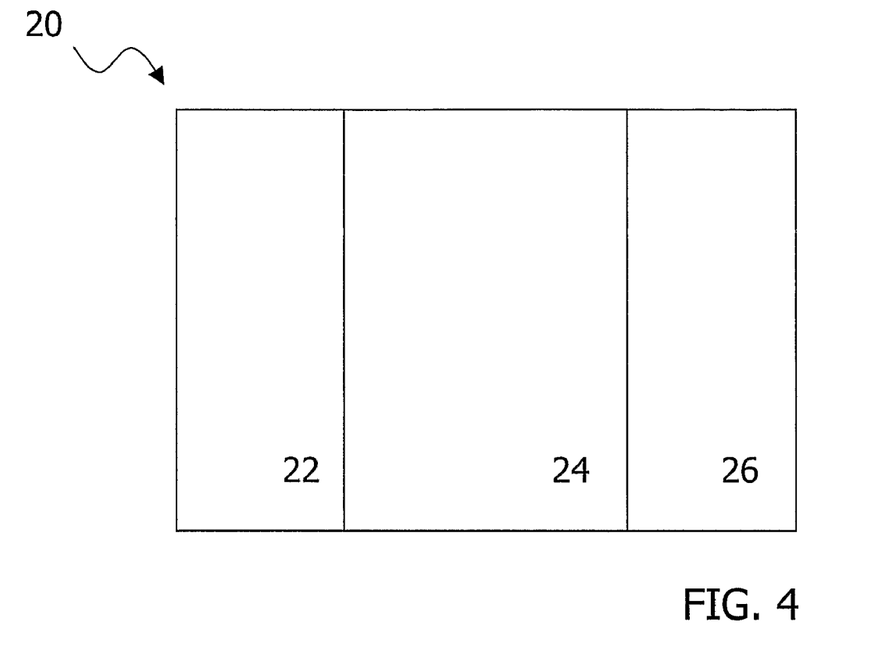
FIG. 4 is a schematic diagram illustrating an embodiment of a base station component.

FIG. 4 shows an embodiment of a base station component 20 that can be used in a telecommunication system 10 as illustrated in FIG. 1 for a more sophisticated radio resource management. As shown in FIG. 4, the base station component 20 comprises a first interface 22 for communication with at least one radio network controlling component such as the RNC 18 component depicted in FIG. 1. Via the first interface 22 the base station component 20 receives one or more interference control parameters. The base station component 20 further comprises a generator 24 for generating one or more scheduling grants based on the one or more interference control parameters received via the first interface 22. For communication with one or more user terminals the base station component 20 comprises a second interface 26. The second interface 26 is used for issuing the generated scheduling grants to one or more user terminals listening to the base station component 20. The user terminals listening to the base station component 20 may be served either the base station component 20 itself or, for example in a soft handover scenario, by another base station component.

Figure 5:
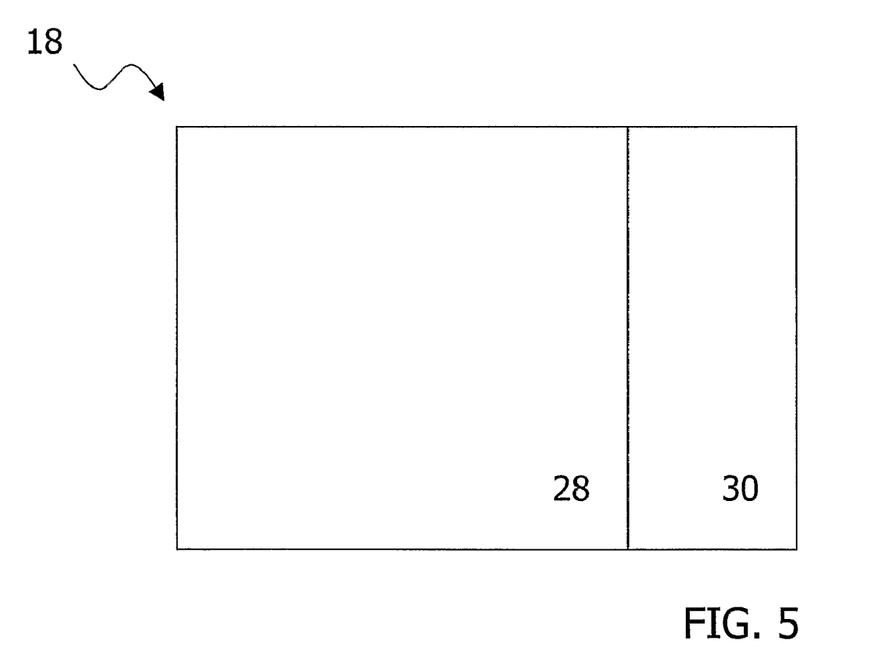
FIG. 5 is a schematic diagram illustrating an embodiment of a radio network component.

As has been mentioned above, the base station component 20 shown in FIG. 4 comprises a first interface 22 for communicating with one or more radio network controlling components 18. FIG. 5 shows an exemplary configuration of such a radio network controlling component 18 that may be associated with the base station component 20 depicted in FIG. 4. In a WDCMA context, the radio network controlling component 18 of FIG. 5 may be configured similar to the RNC component 18 shown in FIG. 1.

As shown in FIG. 5, the radio network controlling component 18 comprises a generator 28 for generating one or more interference control parameters. According to a first option, the one or more interference control parameters are generated based on interference information locally available to (e.g. estimated by) the radio network controlling component 18. According to a second option, that may be combined with a first option, the one or more interference control parameters are generated based on interference related information received from one or more base station components attached to the radio network controlling component 18.

The radio network controlling component 18 further comprises an interface 30 for communicating with one or more of the attached base station components. The interface 30 is used for sending the generated interference control parameters to at least one base station component. Additionally, the interface 30 may serve for receiving interference related information from the at least one base station component.

Figure 6:
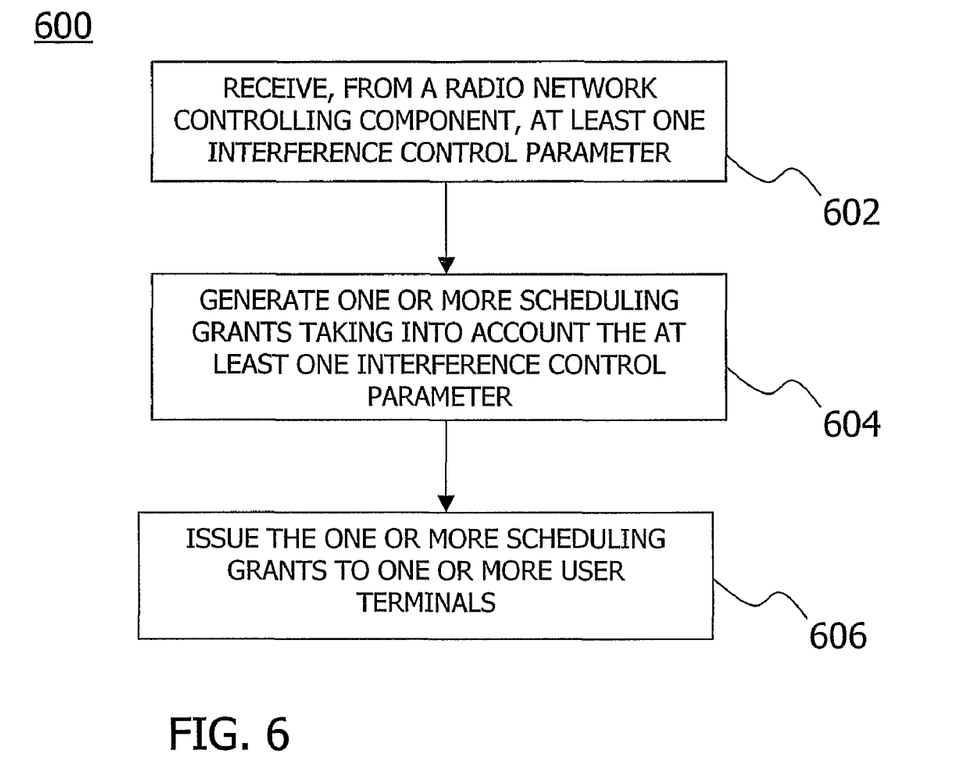
FIG. 6 is a process flow diagram of a first method example embodiment.

Reference is now made to FIG. 6 showing a process flow diagram 600 of a first method embodiment for radio resource management in a cellular telecommunication system. The individual steps of this method embodiment may be performed by the base station components 20 shown in FIGS. 1 and 4 or by base station components having a different configuration.

In a first step 602 of the radio resource management method, one, two or more interference control parameters are received from a radio network controlling component.

In a second step 604, at least one scheduling grant is generated taking into account the one or more interference parameter received in step 602. In this context, the one, two or more interference control parameters previously received from the radio network controlling component may first be evaluated. Based on the evaluation and, if necessary, additional information available to the base station component such as information about the current interference situation, a decision can be made whether or not scheduling grants are to be generated at all. Additionally, or in the alternative, the evaluation may serve for determining the particular type or/and content value of the scheduling grants that are to be generated.

In a further step 606, the one or more scheduling grants generated in step 604 are issued to one or more user terminals listening to the base station component. It should be noted here that if the evaluation of the one or more interference control parameters received in step 602 indicates that no scheduling grants are required (e.g. because the interference is below an interference limit specified in the one or more interference limitation parameters), steps 604 and 606 need not be performed.

Figure 7:
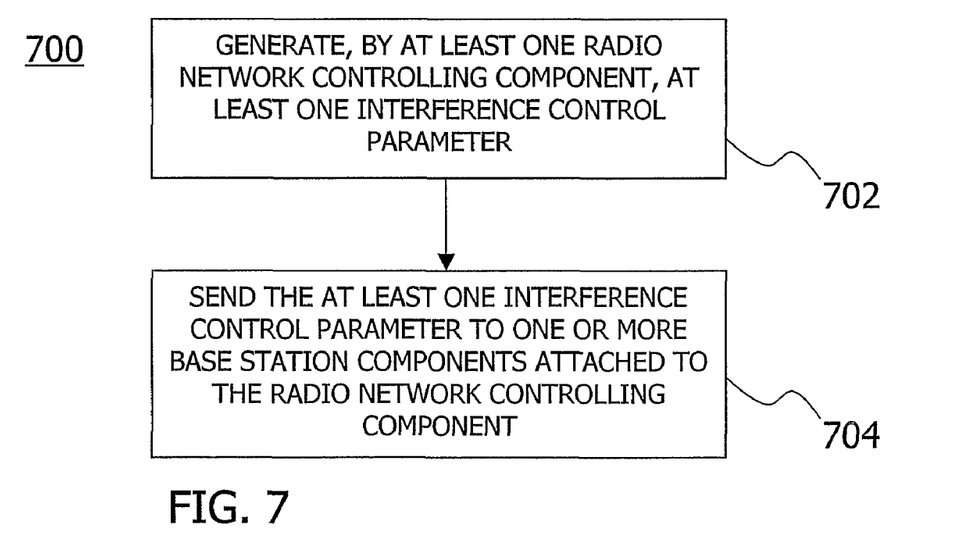
FIG. 7 is a process flow diagram of a second method example embodiment.

FIG. 7 shows a process flow diagram 700 of a further method embodiment for radio resource management in a cellular telecommunication system. The radio resource management illustrated in FIG. 7 may be performed by a radio network controlling component 18 as shown in FIGS. 1 and 5 or by a radio network controlling component having a different configuration.

As shown in FIG. 7, the radio resource manage method starts in step 702 with generating at least one interference control parameter. Via these one interference control parameter may be generated taking into account interference related information received from an external network component. In a next step 704, the at least one generated interference control parameter is sent to one or more base station components attached to the radio network controlling component.

Using the interference control parameter signaling outlined above with reference to FIGS. 6 and 7, the radio network controlling component can influence the scheduling operation of an individual base station component and coordinate the combined scheduling operations of multiple base station components attached to the radio network controlling component. Also, in particular based on interference related information received from one or more base station components, the radio network controlling component may adjust its admission and congestion features to thus arrive at a better overall resource management.

In one embodiment, the interference control parameter signaled by the radio network controlling component to a base station component is configured as an interference limitation parameter specifying an interference limit (or threshold) with respect to a particular cell served by the base station component. According to a first variant, a common interference limit is signaled for a plurality of cells. In another variant, each cell has its individual interference limit.

The interference limitation parameters and the interference limits specified therein may take various forms and can be combined with each other. Several examples in this regard will now be discussed in more detail.

In one example, the interference limitation parameter includes a RTWP parameter such as a maximum total RTWP value reflecting the maximum total interference for an individual cell and optionally including contributions from all uplink traffic and external interference. In another example, the interference limitation parameter comprises a noise-rise related parameter indicative of the Rise-over-Thermal (RoT), e.g. of the total received power in relation to the thermal noise-flow, or a Rise-over-Thermal-and-Other-systems-interference (RoTO) parameter, e.g. a parameter similar to the RoT parameter wherein interference from other systems is considered to be part of the background noise. The noise-rise related parameter may indicate a limit for the total noise-rise in a particular cell, for the noise-rise from E-DCH served user terminals (i.e. user terminals served via E-DCH) and/or for the noise-rise from E-DCH non-served user terminals (i.e. user terminals not served via E-DCH).

According to a still further example, the interference limitation parameter comprises a throughput related parameter referring to the total scheduled E-DCH throughput, the throughput from E-DCH served user terminals and/or the throughput from E-DCH non-served user terminals. The throughput related parameter may specify one or more throughput limits.

In addition, or alternatively, the interference limitation parameter may be configured as a received signal power related parameter. In such a configuration, the interference limitation parameter may impose one or more several limits on the total signal power received at a particular base station component, on the received power from E-DCH served user terminals and/or on the received power from E-DCH non-served user terminals. Also, the interference limitation parameter may be indicative of a relation (e.g. a ratio) between the received power and/or throughput of E-DCH served user terminals and E-DCH non-served user terminals. The received power relation parameter may for example indicate a target value of non-serving E-DCH to serving E-DCH power ratio per cell. The non-serving E-DCH to serving E-DCH power ratio can be the ratio of non-serving RL E-DCH power and serving RLS E-DCH power received at a particular base station component. The received non-serving E-DCH power and serving E-DCH power can be calculated from E-TFC information on the E-DPCCH and a reference power offset. Reference power offset may be defined per individual user terminal and signalled from the radio network controlling component to the particular base station component for this calculation.

In general, the scheduling operation of a particular base station component should strive to keep the cell interference within the limit specified by the one or more interference limitation parameters received from the radio network controlling component. In the case one or more interference limits are not or cannot be met, the base station component may send a corresponding notification message to the radio network controlling component.

In addition (or as an alternative) to generating the scheduling grants with the purpose of meeting one or more of the interference limits, scheduling grants may be generated with the purpose of balancing interference contributions from a first set of mobile terminals served by the particular base station component and a second set of mobile terminals served by another base station component.

In an exemplary implementation that is based on the technical specification TS 25.309, the scheduling base station component has at least two signaling possibilities if the cell load is too high and the cell interference above the signaled limit(s). According to a first variant, the scheduling operation may include issuing a lowered absolute grant or issuing relative grants of the type "down" to one or more user terminals served by the issuing base station component. According to a second variant, the base station component may issue relative grants of the type "down" to one or several user terminals not served by the base station component.

To control the balance between served and non-served user terminals, the base station component may, for example, issue limiting relative grants only to the non-served user terminals in case the received power and/or throughput of the served user terminals is below the limit signaled by the radio network controlling component. Otherwise, limiting (absolute or relative) scheduling grants are issued to the served user terminals.

According to a further variant, each base station component determines (e.g. estimates) the ratio between the total interference and the interference resulting form served user terminals (or a similar quantity). As long as the ratio is smaller than a predefined ratio that has been signaled by a radio network controlling component, the base station component is mainly loaded by interference from user terminals served by itself and is therefore not allowed to lower the data rate for non-served user terminals by addressing them with relative grants of the "down" type (i.e. by setting the E-RGCH overload indicator to "down"). If required, a separate limit or threshold can be signaled from the radio network controlling component to the base station component indicating when the base station component is allowed to lower the data rate for non-served user terminals using the "down" command. In general, the scheduling operation of a particular base station component should consider user terminals in soft handover when balancing served and non-served cells in the same base station component.

In the following, two exemplary interference limitation scenarios will be described with reference to the schematic illustrations of FIGS. 10A and 10B.

Figure 10A:
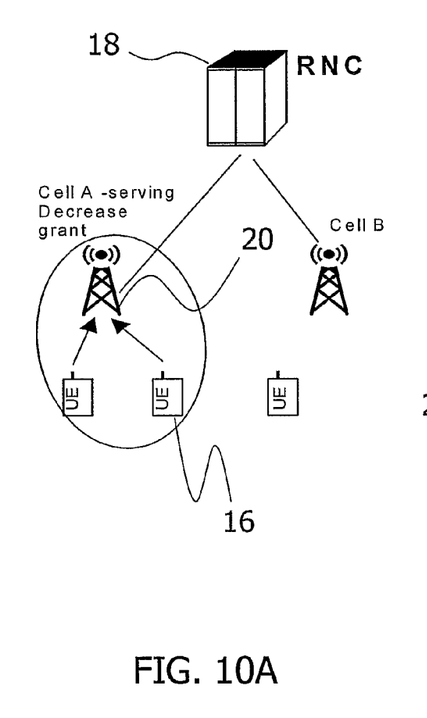
FIGS. 10A and 10B are a schematic illustrations of interference balancing embodiments.

FIG. 10A illustrates the case in which the interference (the load) in cell A exceeds the limits signaled by the radio network controlling component 18 to the respective base station component 20. It is assumed here that the interference is mainly caused by user terminals 16 that are served by the base station component 20 in cell A. The base station component 20 can defeat this situation by checking limits on received power and/or throughput of the E-DCH served user terminals that have previously been signalled by the radio network controlling component 18. In the case the base station component 20 detects that one or more limits are exceeded, it controls (reduces) the load via the scheduling grant channels (E-AGCH and E-RGCH) received by the user terminals 16 served in cell A by the base station component 20. As becomes apparent from FIG. 10A, the base station component 20 does not issue any scheduling grants to user terminals outside the cell A in this case.

Figure 10B:
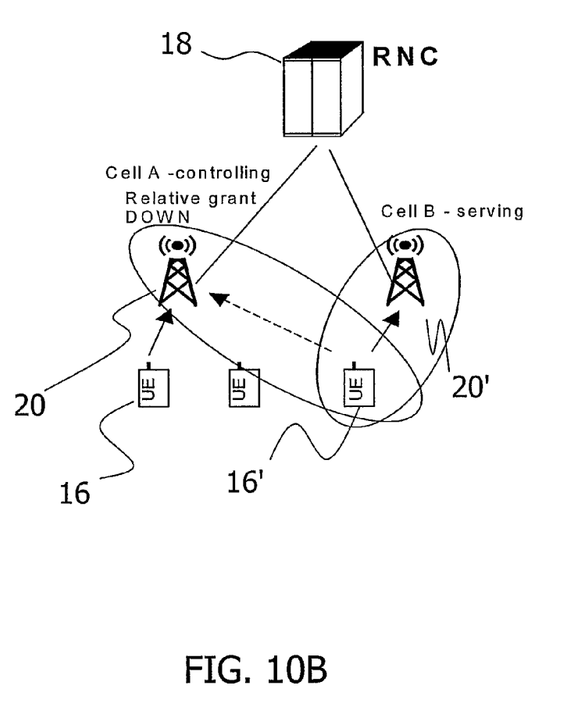

FIG. 10B illustrates the situation in which the interference (the load) in cell A is mainly caused by a user terminal 16' that is situated in cell B and thus served by the corresponding base station component 20'. Again, the base station component 20 serving cell A checks the limits received from the radio network controlling component 18 and detects that the load is mainly caused by the user terminal 16' in cell B. Accordingly, the base station component 20 serving cell A limits its cell A load via the relative grant channel by issuing a "down" command (overload indicator) to the user terminal 16' served in cell B.

As illustrated in FIGS. 10A and 10B, the sophisticated radio resource management signaling involving one or more interference control parameters allows for an efficient interference balancing between served and non-served user terminals. As a result, the available radio resources can be used more efficiently. In particular, the radio resource management functions in the radio network controlling component can be coordinated with the scheduling operations of the base station component, thus resulting in a better radio resource management for the network as a whole.

Figure 8:
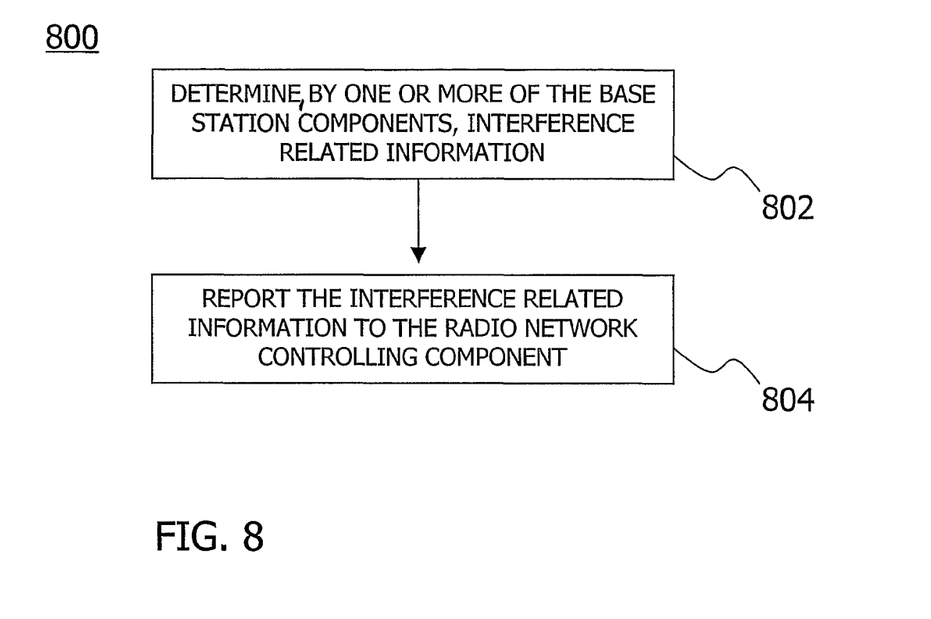
FIG. 8 is a process flow diagram of a third method example embodiment.

FIG. 8 shows a process flow diagram 800 of a further method embodiment in context with managing radio resources in a cellular telecommunication system. The method embodiment shown in FIG. 8 can be performed prior to, concurrent with or after the steps of the method embodiments discussed above with reference to FIGS. 6 and 7. Alternatively, the method embodiment of FIG. 8 can be performed independently therefrom.

The method starts in step 802 with determining, by one or more of the base station components, interference related information. The interference related information may be determined by measurements, by estimation or in any other way.

In a next step 804, the interference related information is sent to the radio network controlling component. The interference related information received at the radio network controlling component may be used for generating one or more interference control parameters, that can then be sent back to one or more of the base station components. Additionally, or in the alternative, the interference related information can be used by the radio network controlling component for the purpose of managing resources between cells. In one example, the radio network controlling component utilises the received interference related information for purposes of admission control and noise-floor estimation. Noise-floor estimation helps the radio network controlling component to set up and coordinate appropriate interference limits for the various cells.

The interference related information signaled by the base station components to the associated radio network controlling components may take various forms. According to a first example, the base station components determine (e.g. by measuring) a RTWP value and report this RTWP value as an absolute interference indicator to the associated radio network controlling components. Alternatively, or additionally, RoT and/or RoTO values may be determined and reported as interference rise indicators.

As a further example, the base station components may determine (e.g. by measurements) their own hardware resource consumption and report a corresponding value to the associated radio network controlling components. The hardware resource consumption can be expressed as an amount of channel elements consumed by one or more user terminals on the E-DCH (e.g. in relation to a maximum spreading factor).

Figure 9:
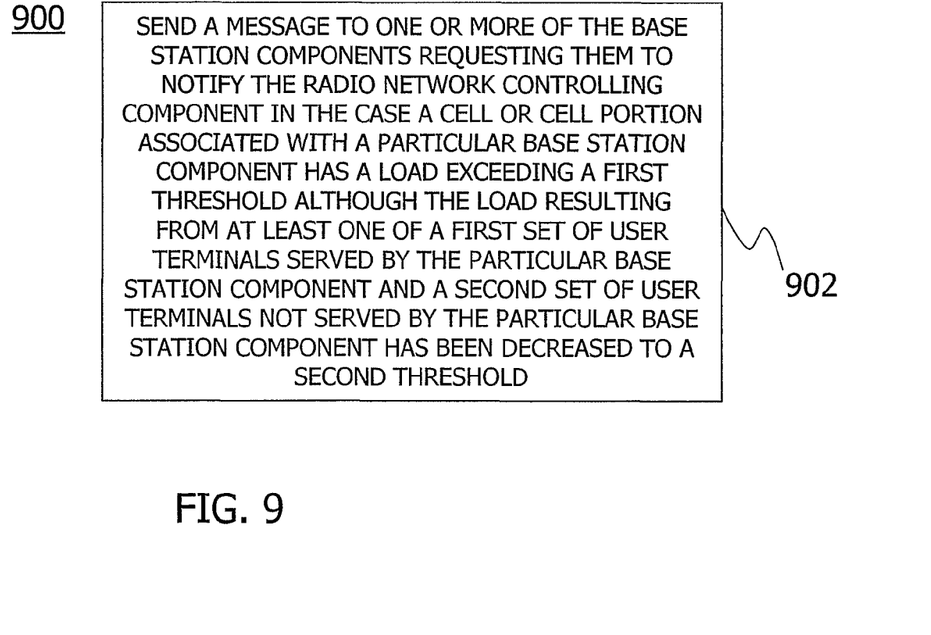
FIG. 9 is a process flow diagram of a fourth method example embodiment.

If the scheduling operations have limited the cell throughput or received power below a certain threshold, but if the cell interference is still too large, the base station components may send corresponding interference related information to the radio network controlling components. FIG. 9 illustrates a process flow diagram 900 of a method embodiment in which a radio network controlling component sends a message to one or more of the base station components requesting a corresponding notification if this situation occurs.

Such a situation may be caused for example by transmissions in other cells and/or by non-scheduled transmissions. If the user terminal prioritizes DCH and/or non-scheduled E-DCH transmissions, this can alternatively be observed by monitoring, e.g., the RTWP. If the interference is too high, the scheduling operation may reduce the data rate, or, ultimately, if the interference is then still too high, admission control of the radio network controlling component may be broken.

The base station component may also signal statistics on the usage of E-RGCH for non-served user terminals (e.g. the overload indicator). An example of statistics information is the frequency of "down" commands towards user terminals belonging to other cells of the active set (e.g. when the frequency exceeds a predefined threshold) all the fraction of time the overload indicator is set to "down" in a particular time interval. If the overload indicator is set to "down" very frequently or a large fraction of time, this signals to the radio network controlling component that the transmissions in neighbouring cells are causing significant interference.

If a data flow is associated with a minimum bit rate or guaranteed bit rate (GBR) that has been configured by the radio network controlling component, the base station components may report to their associated radio network controlling components if the minimum bit rate cannot be kept on the average (for example if the average data rate granted is less than the GBR and/or the minimum rate during certain period of time). Such a situation may occur if the base station component has not sufficient scheduling freedom, in which case the radio network controlling component may increase the limits for the particular cell in question.

A further example of interference related information that may be signaled to the radio network controlling components is constituted by statistics on the difference between the aggregated requested data rates and scheduling grants issued to detect if scheduling requests are in general fulfilled. A large difference between requested and granted data rates indicates that the user terminals need (and can actually support) higher data rates. This information can be used by the radio network controlling components to increase interference limits for the scheduling operations.

A further possibility for interference related information that may be collected and reported to the radio network controlling components are statistics on the happy bit. Such statistics information provide dues to the network controlling component about the power and buffer situation in the user terminals. The statistics can be collected either individually per user terminal or aggregated for all user terminals served by a base station component in a particular cell. Additionally, or in the alternative, statistics on the requested data rates and granted data rates for both served and non served user terminals may be collected and reported to the radio network controlling components.

A still further possibility for interference related information is the E-DCH load from users served by a particular base station component in a particular cell and/or in neighbouring cells (e.g. expressed as throughput or relative received power). In this context, statistics on the E-DCH load can be measured and reported to the radio network controlling component. The E-DCH load can be divided into load originating from E-DCH uses scheduled by the particular base station component and the load resulting from user terminals scheduled by other base station components. The load indication could be measured by a particular base station component as the aggregated received signal code power (RSCP) from all users and can be expressed as part of the interference rise or as part of the total interference.

Based on the interference related information received from a plurality of attached base station components, a radio network controlling component can globally adjust the interference situation and/or globally coordinate admission and congestion control with respect to all attached base station components. To determine, for example, for a particular cell the neighbouring cells that need to be adjusted, the radio network controlling component may check a ranking list of the particular loaded cell or use path gain measurement reports from user terminals served by the loaded cell. Of course, there may also be other reasons causing the detected interference problems such as a user terminal that has been denied a soft handover link to the loaded cell or a serving cell change to the loaded cell. In this case, the radio network controlling component may choose to use TFC limitation to limit the data rate of the particular user terminal, rather than taking actions that will result in scheduling operations affecting the whole cell. The new reporting mechanism involving the reception of interference related information at the radio network controlling component thus allows for a better radio resource management.

One improvement in this regard becomes readily apparent when considering the following scenario. When setting up certain data flows on the E-DCH with a required minimum bit rate, it is useful for the radio network controlling component to be aware of whether or not the minimum bit rate is met. The reason for this is the fact that in the case the requirements can not be met, the radio network controlling component should take necessary congestion and admission actions. If, however, a particular data flow has a data rate that is less than the minimum rate, this can either be caused by the local application in the user terminal generating less data or by a scheduling operation limiting the allowed data rate due to an unsatisfying interference/load condition. Only the base station component can distinguish between these two situations, and the radio network controlling component will therefore not know when to take necessary admission and congestion actions. This problem can be solved by transmitting appropriate interference related information from the base station component to the radio network controlling component to inform the radio network controlling component about the reason a certain minimum data rate can not be attained.

In the embodiments discussed above, the interference control parameter was mainly described in context with interference limitation. In the following embodiment, the interference control parameter takes the form of a cell group association parameter indicating in relation to a particular user terminal if it is to be controlled by relative scheduling grants from one or more particular base station components.

In general, there is a need to control the set of cells/base station components that can issue relative grants a particular mobile terminal has mandatorily to obey. Also the usage of the relative grants by a particular base station component for non-served user terminals has to be controlled. Without such a control, there is always a risk that user terminals at cell borders will get a poor throughput or no throughput at all. Alternatively, individual cells may suffer from strong inter-cell interference.

To get a balanced interference situation between cells, it is proposed to control the set of cells that may issue a relative grant a particular user terminal must detect and obey to. One solution in this regard would be to let the corresponding cell set be identical with the active set. However, in the choice of the active set other factors than interference control have to be taken into account, for example the load in the transport network. Accordingly, there is a risk that a user terminal transmitting with a high data rate will cause interference in neighbouring cells although it is not in soft handover and will therefore not obey to relative grants (overload indicators) issued by neighbouring cells. As a result, the scheduling operation in a particular base station component will not be able to control the interference situation in a satisfying manner. On the other hand, the set of cells that a user terminal detects the relative grant from should be kept as small as possible to limit the processing complexity in the user terminal (and to not unnecessarily restrict the bit rate used by the user terminal).

To define the smallest possible cell set that still enables the scheduling operations of the base station components to adequately control the interference situation, it is thus proposed to select a set of cells different from the active set, the so-called controlling set. The controlling set includes all cells that are permitted to issue relative grants for a particular user terminal.

The radio network controlling component (or any other network component) is able to define and modify the controlling cell set in a similar way as the active set is controlled according to the current WCDMA specifications.

In one implementation, the network signals reporting criteria via the base station component to a particular user terminal (such as a relation between the CPICH power of a cell and the corresponding CPICH power of the best cell, a hysteresis or a time to trigger). Such a signaling is in accordance with the current radio resource control (RRC) Measurement control message. The user terminal then reports to the network according to the criteria with the already specified RRC measurement reports. Based on these reports, the radio network controlling component defines or modifies the controlling set and sends an RRC message with a corresponding cell group association parameter via the base station component to the corresponding user terminal.

According to a first option, the base station component transparently forwards the cell group association parameter to the particular user terminal. In this case, the user terminal only follows relative grants issued for cells that are included in the currently valid controlling set. According to a further option, the base station component evaluates the cell group association parameter received from the radio network controlling component. In this case, the base station component sends relative grants to a particular user terminal only if the base station component actually serves a cell indicated in the controlling set for the particular user terminal.

Using the cell group association parameter, the network can modify the controlling set (for example by adding, removing and/or replacing individual cells) and thus adjust the overall interference situation. If required, the network can also be configured to inform the user terminal that the controlling set is the same set of cells as the active set.

While the technology disclosed herein has been described with respect to particular embodiments, including certain device arrangements and certain orders of steps within various methods, those skilled in the art will recognize that the technology disclosed herein is not limited to the specific embodiments described and illustrated herein. Therefore, it is to be understood that this disclosure is only illustrative. Accordingly, it is intended that the technology disclosed herein be limited only by the scope of the claims appended hereto.

The invention claimed is:

1. A method of radio resource management in a cellular telecommunication network comprising at least one radio network controlling device and one or more base station devices, the one or more base station devices being operable to implement an uplink scheduling scheme in relation to one or more user terminals, the method comprising:
   receiving, by one of the base station devices from the at least one radio network controlling device, from a transmission over the telecommunication network, at least one interference control parameter, wherein the at least one interference control parameter comprises one or more interference limitation parameters each specifying an interference limit;
   generating one or more scheduling grants taking into account the at least one interference control parameter;
   issuing the one or more scheduling grants to one or more user terminals; and
   sending a notification message to the radio network controlling device in the case the interference limit is not or can not be met.

2. The method of claim 1, wherein the notification message indicates that a cell or cell portion associated with the issuing base station component has an interference exceeding a first interference limit although the interference resulting from at least one of a first set of user terminals served by the issuing base station component and a second set of user terminals not served by the issuing base station component has been decreased to a second interference limit.

3. The method of claim 1, wherein the generated scheduling grants aim at not exceeding the interference limit.

4. The method of claim 1, wherein the generated scheduling grants aim at balancing interference contributions from a first set of mobile terminals served by the issuing base station component and a second set of mobile terminals served by another base station component.

5. The method of claim 1, wherein the one or more interference limitation parameters are selected from the group comprising a Received Total Wideband Power (RTWP) related parameter, a noise-rise related parameter, a throughput related parameter, a received signal power related parameter, and a parameter indicative of a received power relation between a first set of mobile terminals served by the issuing base station component and a second set of mobile terminals served by another base station component.

6. The method of claim 1, further comprising:
   determining interference-related information; and
   reporting the interference-related information to the radio network controlling component.

7. The method of claim 6, wherein the interference-related information comprises at least one of RTWP information, hardware consumption information in relation to the reporting base station component, load information in relation to user terminals served by a particular base station component or served by base station components excluding the particular base station component, noise-rise information, overload information, and bit rate information.

8. The method of claim 1, wherein the at least one interference control parameter comprises a cell group association parameter indicating in relation to a particular user terminal if it is to be controlled by relative scheduling grants from one or more particular base station components.

9. The method of claim 8, further comprising forwarding the cell group association parameter to the particular user terminal.

10. The method of claim 8, wherein the particular user terminal is associated with a controlling cell set indicative of base station components issuing relative scheduling grants that are mandatory to the particular user terminal, and wherein the cell group association parameter indicates to the particular user terminal a modification of the controlling cell set.

11. A method of radio resource management in a cellular telecommunication network comprising at least one radio network controlling device and one or more base station devices, the one or more base station devices being operable to implement an uplink scheduling scheme in relation to one or more user terminals, the method comprising:
   generating, by the at least one radio network controlling device, at least one interference control parameter, the at least one interference control parameter comprising one or more interference limitation parameters specifying an interference limit that is to be met by way of uplink scheduling;
   sending the at least one interference control parameter, from a transmission over the telecommunication network, to one or more base station devices; and
   receiving, by the at least one radio network controlling device, a notification message indicating that at least one interference limit is not or can not be met at one of the base station devices.

12. The method of claim 11, wherein the at least one interference control parameter comprises one or more cell group association parameters indicating in relation to a particular user terminal if it is to be controlled by relative scheduling grants of one or more particular base station components.

13. The method of claim 12, wherein the particular user terminal is associated with a controlling cell set indicative of base station components issuing relative scheduling grants that are mandatory to the particular user terminal, and wherein the cell group association parameter indicates to the particular user terminal a modification of the controlling cell set.

14. The method of claim 11, further comprising sending a message to one or more of the base station components requesting them to notify the radio network controlling component in the case a cell or cell portion associated with a particular base station component has a load exceeding a first threshold although the load resulting from at least one of a first set of user terminals served by the particular base station component and a second set of user terminals not served by the particular base station component has been decreased to a second threshold.

15. The method of claim 11, further comprising:
receiving interference related information from one or more base station components; and
generating the at least one interference control parameter based on the received interference related information.

16. A method of radio resource management in a cellular telecommunication network comprising at least one radio network controlling device and one or more base station devices, the method comprising:
determining, by one or more of the base station devices, interference related information; and
reporting the interference related information to the at least one radio network controlling device by transmitting the interference related information over the telecommunication network,
wherein the interference related information comprises at least one of RTWP information, hardware consumption information in relation to an individual base station component, load information in relation to user terminals served by a particular base station component or served by base station components excluding the particular base station component, noise-rise information, overload information, and bit rate information.

17. A method of radio resource management in a cellular telecommunication network comprising at least one radio network controlling device and one or more base station devices, the method comprising:
receiving, from one or more base station devices, from a transmission over the telecommunication network, interference related information; and
evaluating the interference related information in context with performing at least one of interference control, admission control and congestion control,
wherein the interference related information comprises at least one of RTWP information, hardware consumption information in relation to an individual base station component, load information in relation to user terminals served by a particular base station component or served by base station components excluding the particular base station component, noise-rise information, overload information, and bit rate information.

18. A computer program product comprising program code portions stored on a non-transitory computer-readable recording medium for performing the steps of claim 1 when the computer program product is run on one or more computing devices.

19. A base station device for a cellular telecommunication network including at least one radio network controlling device, the base station device being operable to implement an uplink scheduling scheme in relation to one or more user terminals and comprising:
a first interface configured to receive, from a transmission over the telecommunication network by the at least one radio network controlling device, at least one interference control parameter, wherein the at least one interference control parameter comprises one or more interference limitation parameters each specifying an interference limit;
a generator configured to generate one or more scheduling grants taking into account the at least one interference control parameter;
a second interface for issuing the one or more scheduling grants to one or more user terminals; and
means for sending a notification message to the radio network controlling device in the case the interference limit is not or can not be met.

20. A radio network controlling device for a cellular telecommunication network including one or more base station devices operable to implement an uplink scheduling scheme in relation to one or more user terminals, the radio network controlling device comprising:
a generator configured to generate at least one interference control parameter, wherein the at least one interference control parameter comprises one or more interference limitation parameters each specifying an interference limit;
an interface configured to send the at least one interference control parameter, via a transmission over the telecommunication network, to one or more base station devices, and
means for receiving a notification message indicating that at least one interference limit is not or can not be met at one of the base station devices.

* * * * *